US009449247B2

(12) United States Patent
Yamada

(10) Patent No.: US 9,449,247 B2
(45) Date of Patent: Sep. 20, 2016

(54) CONTOUR CORRECTION DEVICE, METHOD, AND PROGRAM

(71) Applicant: FUJIFILM Corporation, Tokyo (JP)

(72) Inventor: Kenta Yamada, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/958,843

(22) Filed: Dec. 3, 2015

(65) Prior Publication Data

US 2016/0086049 A1 Mar. 24, 2016

Related U.S. Application Data

(63) Continuation of application No. PCT/JP2014/003070, filed on Jun. 9, 2014.

(30) Foreign Application Priority Data

Jun. 11, 2013 (JP) .................................. 2013-122314

(51) Int. Cl.
*G06K 9/00* (2006.01)
*G06K 9/46* (2006.01)
(Continued)

(52) U.S. Cl.
CPC ........... *G06K 9/4604* (2013.01); *G06K 9/6267* (2013.01); *G06T 7/0012* (2013.01); *G06T 7/0083* (2013.01); *G06T 7/0085* (2013.01); *G06T 11/60* (2013.01); *G06T 11/80* (2013.01); *G06K 2009/4666* (2013.01); *G06T 2207/20101* (2013.01); *G06T 2207/30048* (2013.01)

(58) Field of Classification Search
USPC ....................................................... 382/128
See application file for complete search history.

(56) References Cited

U.S. PATENT DOCUMENTS 7,817,164 B2 * 10/2010 Shirahata ................ G06T 11/60
345/619
2002/0102023 A1 * 8/2002 Yamauchi ........... G06F 19/3437
382/199

(Continued)

FOREIGN PATENT DOCUMENTS

JP   H 07-37107 A    2/1995
JP   2002-210027 A   7/2002

(Continued)

OTHER PUBLICATIONS

International Search Report (ISR) (PCT Form PCT/ISA/210), in PCT/JP2014/003070, dated Sep. 2, 2014.

(Continued)

*Primary Examiner* — Wesley Tucker
(74) *Attorney, Agent, or Firm* — McGinn IP Law Group, PLLC

(57) ABSTRACT

An input to set a correction contour line inside one region from an operator is received, and a contour line of the one region is corrected so that the correction contour line becomes a part of a contour line after correction. In this case, when a start point of the correction contour line is located on a unique contour line of each region and an end point thereof is located on a contour line shared by the two regions, the contour line of the other region is maintained, and when the start point is located on the shared contour line and the end point is located on the unique contour line, the contour line of the other region is also corrected so that the correction contour line becomes the shared contour line in the contour lines of the two regions after the correction.

8 Claims, 6 Drawing Sheets

(51) Int. Cl.
*G06T 7/00* (2006.01)
*G06T 11/60* (2006.01)
*G06K 9/62* (2006.01)
*G06T 11/80* (2006.01)

(56) References Cited

U.S. PATENT DOCUMENTS

| | | |
|---|---|---|
| 2007/0273934 A1 | 11/2007 | Shirahata et al. |
| 2008/0304730 A1* | 12/2008 | Abe ............... A61B 8/08 382/131 |
| 2012/0324385 A1 | 12/2012 | Johnston et al. |
| 2013/0182935 A1* | 7/2013 | Wang .............. G06T 7/2033 382/133 |
| 2014/0286551 A1* | 9/2014 | Yoshida ........... G06T 19/00 382/128 |
| 2015/0317799 A1* | 11/2015 | Akahori ........... G06T 7/0081 382/128 |
| 2016/0035071 A1* | 2/2016 | Yamada ........... A61B 6/503 345/647 |

FOREIGN PATENT DOCUMENTS

| | | |
|---|---|---|
| JP | 2004-113592 A | 4/2004 |
| JP | 4368378 B2 | 11/2009 |
| JP | H 4368378 B2 | 11/2009 |
| JP | 2012-045256 A | 3/2012 |
| JP | 2012-081177 A | 4/2012 |

OTHER PUBLICATIONS

International Search Opinion (PCT/ISA/237) and an English translation thereof.

German Office Action dated Jun. 16, 2016 with an English translation thereof.

"What is editing?" Article by the GIS Laboratory of the California Institute of Technology, document available on the Internet on Nov. 23, 2011, at the URL https://web.archive.org/web/20111123173855/http://web.gps.caltech.edu/gislab/HowTo/Docs.html; retrieved on Jun. 10, 2016; pp. 1-350.

* cited by examiner

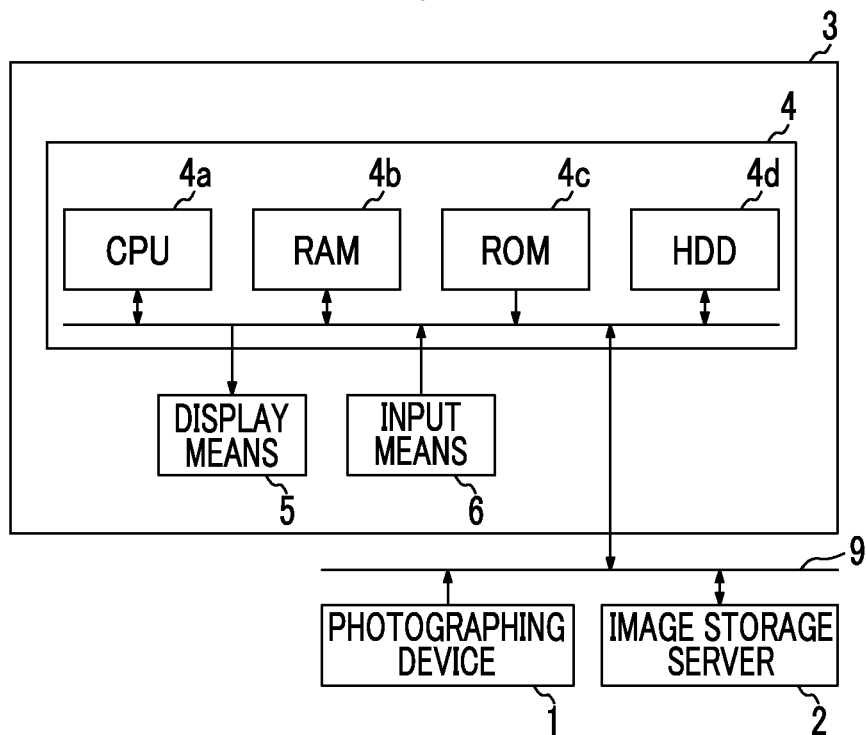
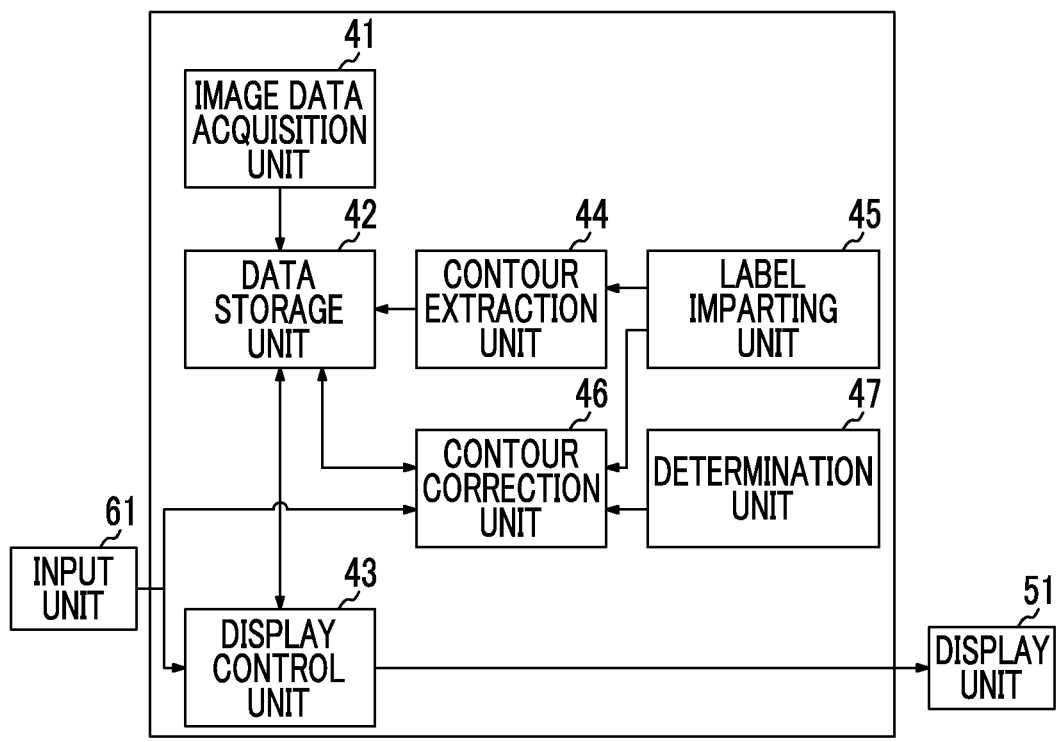

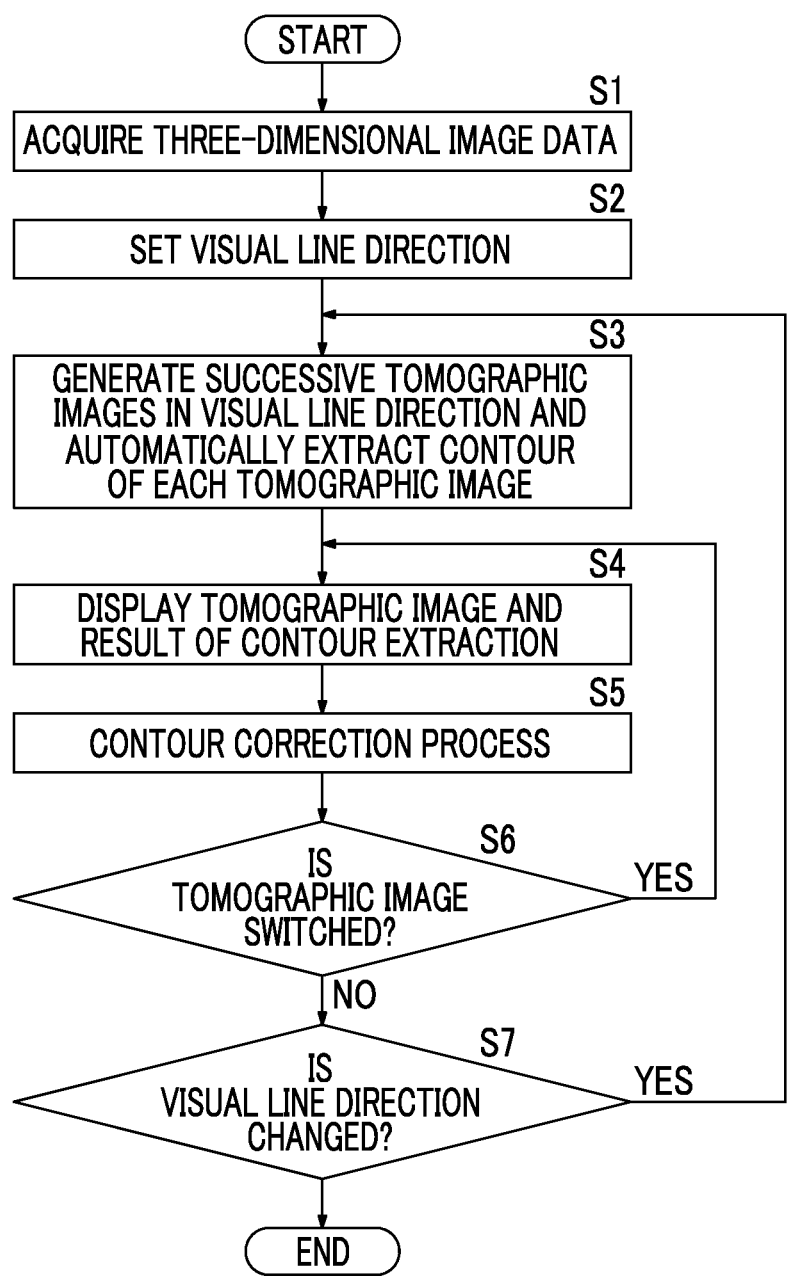

CONTOUR CORRECTION DEVICE, METHOD, AND PROGRAM

CROSS-REFERENCE TO RELATED APPLICATIONS

This application is a Continuation of PCT International Application No. PCT/JP2014/003070 filed on Jun. 9, 2014, which claims priority under 35 U.S.C. §119 (a) to Japanese Patent Application No. 2013-122314 filed on Jun. 11, 2013. Each of the above application is hereby expressly incorporated by reference, in its entirety, into the present application.

BACKGROUND OF THE INVENTION

1. Field of the Invention

The present invention relates to a contour correction device, a method, and a program in which contour lines of two adjacent regions in which a part of the contour line is shared are corrected according to an input operation of an operator using a mouse or the like.

2. Description of the Related Art

Conventionally, in the medical field, a process of automatically extracting and displaying a contour of an organ region or the like from a medical image is performed in order to provide an image with high diagnosis performance. However, in some cases, a contour of a target region cannot be correctly extracted through only an automatic extraction process using a computer. In this case, it is necessary to apply required correction to the contour line of the target region obtained through the automatic extraction, through a manual operation.

As a method of correcting a contour line based on a manual operation, a scheme of re-extracting a contour line to pass through a position after movement of a selected point in response to an operation to select and move an arbitrary point on the contour line has been proposed in JP2012-81177A. Further, a scheme of correcting a contour line using an input correction contour line in response to an operation of inputting the correction contour line has been proposed in JP4368378B.

Further, in JP2012-045256A, a method of correcting a contour line of a plurality of adjacent target regions extracted by region division, which is a scheme of enlarging or reducing one region and correspondingly reducing or enlarging the other region in response to an operation to move a position of an adjacent surface (boundary surface) between the regions, has been proposed.

SUMMARY OF THE INVENTION

However, in the schemes described in JP2012-81177A and JP4368378B, when there are a plurality of regions in which correction of contours is required, there is a problem in that an operator should perform a correction operation on each of the plurality of regions, and time and effort are required. Further, in the scheme described in JP2012-045256A, there is a problem in that two adjacent regions are always integrally corrected in their adjacent surfaces, and accordingly, correction such as separation of the one region from the other region cannot be performed.

The present invention has been made in view of the above circumstances, and relates to a contour correction device, a method, and a program capable of flexibly performing required correction on contour lines of two adjacent regions in which a part of the contour line is shared, with few operations.

A contour correction device of the present invention is a contour correction device that corrects, for contour lines of two adjacent regions in which a part of the contour line displayed on a display screen is shared, one of the contour lines bisected by a correction contour line of one of the two regions, so that a set correction contour line becomes a part of the contour line of the one region after correction, in response to an input to set the correction contour line in which two different points on the contour line of the one region are a start point and an end point, inside the one region from an operator using input unit for designating an arbitrary position in the display screen, the contour correction device including: determination unit for determining whether the start point and the end point are located on a shared contour line that is the contour line shared by the two regions or on a unique contour line that is a contour line other than the shared contour line; and contour correction unit for maintaining the contour line of the other region when correcting the contour line of the one region so that the correction contour line becomes a unique contour line in the contour line of the one region after correction, and a part that is the shared contour line of the contour line of the one region to be corrected becomes a unique contour line in the contour line of the other region after correction if it is determined that the start point is located on the unique contour line and the end point is located on the shared contour, and correcting the contour line of the other region so that the correction contour line becomes a shared contour line in the contour lines of the two regions after correction rather than the part that is a shared contour line of the contour line of the one region to be corrected when correcting the contour line of the one region, if it is determined that the start point is located on the shared contour line and the end point is located on the unique contour.

In the contour correction device, if it is determined that both of the start point and the end point are located on the shared contour line, the contour correction unit may correct both of the contour lines of the two regions by correcting the contour line shared by the two regions, so that the correction contour line becomes a shared contour line in the contour lines of the two regions after correction rather than a portion interposed between the start point and the end point of the shared contour line, when correcting the contour line of the one region.

Further, if it is determined that both of the start point and the end point are located on the unique contour line, the contour correction unit may correct the contour line including the shared contour line among the bisected contour lines of the one region and maintain the contour line of the other region, so that the correction contour line becomes a unique contour line in the contour line of the one region after correction and the shared contour line becomes a unique contour line in the contour line of the other region after correction, when correcting the contour line of the one region.

Further, in the contour correction device, the contour lines of the two regions may be point strings of control points, the contour correction device may include label imparting unit for imparting different labels to the control point located on the shared contour line and the control point located on the unique contour line, and the determination unit may perform the determination by referring to the respective labels imparted to the two control points corresponding to the start point and the end point.

Further, the contour correction unit may set a shorter contour line among the bisected contour lines as a correction target when correcting the contour line of the one region.

Further, the two regions may be regions representing two adjacent portions among a right atrium, a left atrium, a right ventricle, a left ventricle, and a myocardium.

A contour correction method according to the present invention is a method of causing a computer to execute a process performed by each unit of the contour correction device of the present invention.

A contour correction program according to the present invention is a program for causing a computer to function as each unit of the contour correction device of the present invention. This program is recorded on a recording medium such as a CD-ROM or a DVD, or recorded in a storage attached to a server computer or a network storage so that the program can be downloaded, and is provided to a user.

According to the contour correction device, the method, and the program of the present invention, when the correction is performed on the contour lines of two adjacent regions in which a part of the contour line is shared in response to an input of the correction contour line from the operator, it is determined whether a correction target is only one region or the two regions based on a method of inputting the correction contour line (positions of the start point and the end point). Thus, it is possible to selectively execute the correction process in which the correction target is only one region and the correction process in which the correction targets are both of the regions by only inputting the correction contour line instead of separately performing an operation for designating the correction target. As a result, the operator can flexibly perform required correction with few operations.

BRIEF DESCRIPTION OF THE DRAWINGS

FIG. 1 is a schematic configuration diagram of an image diagnosis support system to which a contour correction device of the present invention is introduced.

FIG. 2 is a functional block diagram of the contour correction device.

FIG. 7 is a diagram illustrating an example of a flow of a process that can be performed by the contour correction device.

DESCRIPTION OF THE PREFERRED EMBODIMENTS

Figure 3:
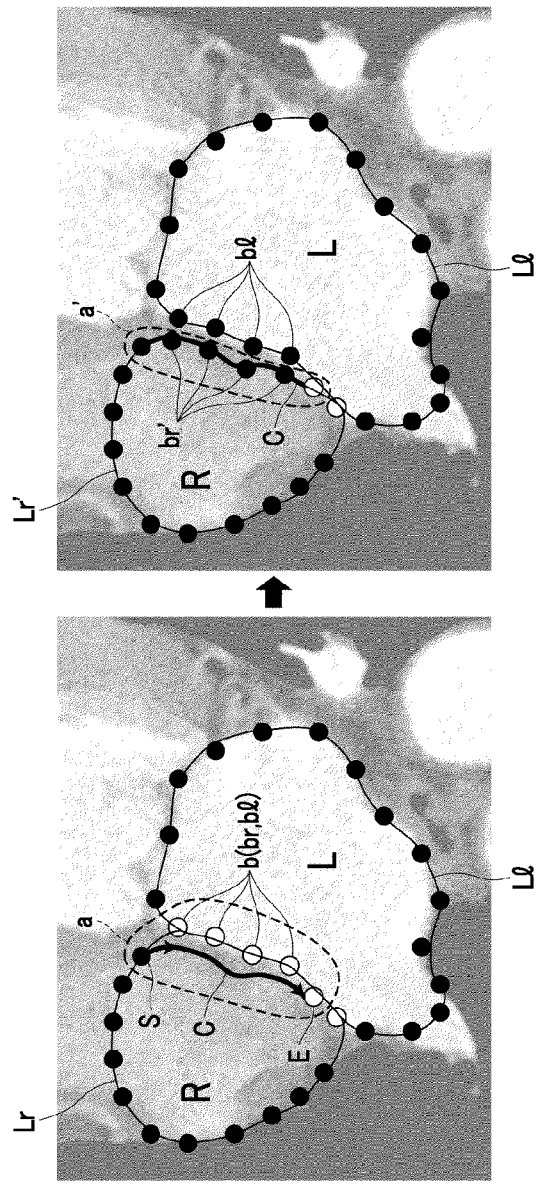
FIG. 3 is a diagram illustrating an example of a contour correction process when a start point of a correction contour line is a unique point and an end point thereof is a shared point.

Hereinafter, an image diagnosis support system to which a contour correction device is introduced in an embodiment of the present invention will be described. FIG. 1 is a hardware configuration diagram illustrating an overview of the image diagnosis support system. As illustrated in FIG. 1, in this system, a photographing device 1, an image storage server 2, and a contour correction device 3 are connected in a state in which they can communicate over a network 9.

The photographing device 1 is a device that photographs an inspection target portion of a subject to generate three-dimensional image data (volume data) including a plurality of successive tomographic images and outputs the three-dimensional image data as image information. Specific examples include a computed tomography (CT) device and a magnetic resonance imaging (MRI) device.

The image storage server 2 is a computer that stores and manages image data output by the photographing device 1 or the like in a database, and includes a large-capacity external storage device or database management software (for example, object relational database (ORDB) management software).

The contour correction device 3 is a computer (including a smartphone or a tablet computer) that executes various image processing in response to an input from an operator, and includes a device main body 4 including a CPU or the like, a display means 5 such as a display, and an input means 6 such as a keyboard or a mouse. In the device main body 4, a CPU 4$a$, a RAM 4$b$, a ROM 4$c$, and a HDD 4$d$ are provided and connected to each other by a bus line. The CPU 4$a$ performs various control processes and calculation processes according to programs stored in the ROM 4$c$ or the HDD 4$d$ using the RAM 4$b$ as a primary storage region. Various programs including a contour correction program of the present invention, and data are stored in the HDD 4$d$.

FIG. 2 is a functional block diagram illustrating functions of the contour correction device 3. As illustrated in FIG. 2, the device main body 4 of the contour correction device 3 functions as an image data acquisition unit 41, a data storage unit 42, a display control unit 43, a contour extraction unit 44, a label imparting unit 45, a contour correction unit 46, a determination unit 47, or the like when the CPU 4$a$ executes information processing according to the program stored in the HDD 4$d$. Further, the display means 5 functions as a display unit 51, and the input means 6 functions as an input unit 61.

In response to an input to specify an image of an observation target and instruct to display the image from the operator, the image data acquisition unit 41 acquires the specified three-dimensional image data from the photographing device 1 or the image storage server 2. The image data acquired by the image data acquisition unit 41 is stored in the data storage unit 42. The data storage unit 42 performs writing and reading of the data to and from the HDD 4$d$. The data storage unit 42 is accessed by the display control unit 43, the contour extraction unit 44, the label imparting unit 45, the contour correction unit 46, and the determination unit 47, and performs reading and writing of the data.

In response to an input to instruct to perform various displays from the operator, the display control unit 43 generates a display image based on various information stored in the data storage unit 42, and displays the generated display image on a display screen of the display unit 51. For example, in response to an input to instruct to perform screen display for performing contour confirmation work from the operator, the display control unit 43 generates, as a display image, an image in which information on the contour line extracted and corrected in the tomographic image is displayed to be superimposed on each tomographic image constituting the three-dimensional image data of the observation target, and displays the image on the display screen.

The contour extraction unit 44 extracts contour lines of a plurality of adjacent regions from the tomographic image of the observation target. Specifically, the contour extraction unit 44 extracts edges from the tomographic image and connects the edges to thereby extract each region of the target, and extracts a boundary between the extracted region and another region as the contour line of the region. In the three-dimensional image data of the observation object, when a plurality of desired adjacent regions are extracted through a three-dimensional region extraction process in advance and, accordingly, the contour lines of the regions in each tomographic image are also known, it is sufficient to use a result of the extraction, and accordingly, the region extraction process for each tomographic image can be omitted.

In particular, it is assumed that, in the contour line of this embodiment, a plurality of points (control points) are arranged at regular or irregular intervals. Further, the contour lines overlap in a portion in which a plurality of adjacent regions are adjacent, and the two adjacent regions in the overlapping portion share one contour line.

A diagram on the left of FIG. 3 is a diagram illustrating an example of a contour line extracted from a tomographic image in which two regions of right and left ventricles of a heart are represented. White circles in FIG. 3 indicate points on the contour line (shared contour line) shared by the regions, and black circles indicate points on contour lines other than the shared contour line (unique contour line). Further, the label imparting unit 45 imparts a label "shared point" to the shared points indicated by the white circles, and the label imparting unit 45 imparts a label "unique point" to the unique points of each region indicated by the black circles. The label imparting unit 45 imparts a label to each of the plurality of points constituting the contour line extracted by the contour extraction unit 44 such that the point can be distinguished as the shared point or the unique point, and imparts different labels to the shared point and the unique point. Information on the thus extracted contour line is stored in the data storage unit 42, and the display control unit 43 displays the contour line on the display screen by referring to the stored information on the contour line.

The contour correction unit 46 performs contour line correction on the contour line of the two adjacent regions in which a part of the contour line displayed on the display screen is shared by the display control unit 43 in response to an input to set a correction contour line in which two different points on the contour line of one of the two regions are a start point and an end point, respectively, inside the region from the operator using the input means such as a mouse. Since the points constituting the contour line include two type of points: the shared point located on the shared contour line and the unique point located on the unique contour line, the start point and the end point of the correction contour line correspond to one of four combinations including "unique point, shared point", "shared point, unique point", "unique point, unique point", and "shared point, shared point". When the correction contour line is set by the operator, the determination unit 47 first determines whether each of the start point and the end point of the correction contour line is the unique point or the shared point by referring to the labels imparted to the start point and the end point of the correction contour line. Then, the contour correction unit 46 determines which of the four combinations a combination of the start point and the end point corresponds to based on a determination result of the determination unit 47, and performs a contour correction process corresponding to the determined combination. Hereinafter, the contour correction process performed in the case of each combination will be described.

<Start Point: Unique Point, and End Point: Shared Point>

When it is determined that the start point is the unique point, and the end point is the shared point, the contour line of one region in which the correction contour line has been set is corrected such that the correction contour line becomes a part of the contour line of the one region after correction, and the contour line of the other region is maintained. The correction contour line that has become a part of the contour line of the one region after correction through the correction becomes a unique contour line of the region, and the shared contour line corrected in the one region and maintained in the other region becomes a unique contour line in the contour line of the other region after correction.

For example, in two adjacent regions R and L in which a part of the contour line is shared as illustrated in a diagram on the left of FIG. 3, when a correction contour line C in which a start point S is a unique point and an end point E is a shared point is set inside the region R, a short side of the contour line Lr bisected by the correction contour line C (point string a side) is first determined as a side to be corrected, a point string b (excluding the start point) included in the point string a on the side to be corrected is duplicated to obtain point strings br and bl, and the duplicated point strings br and bl constitute the contour lines Lr and Ll, respectively. As illustrated in a diagram on the right of FIG. 3, the point string a (including the point string br) is corrected to be a point string a' (including a point string br') on the correction contour line C. On the other hand, the contour line Ll of the region L including the point string bl is maintained. Further, the label imparting unit 45 imparts a label "unique point" to the point strings br and bl.

<Start Point S: Shared Point, and End Point E: Unique Point>

When it is determined that the start point S is the shared point, and the end point E is the unique point, correction is performed to enlarge or reduce one region in which the correction contour line has been set using the correction line, and correspondingly reduce or enlarge the other region. Specifically, the contour line of the one region in which the correction contour line has been set is corrected so that the correction contour line becomes a part of the contour line after the correction, and the contour line of the other region is also corrected so that the correction contour line becomes a shared contour line between the contour lines of the two regions after correction rather than a portion that is a shared contour line of the contour line of the one region to be corrected. In this case, in the other region, a connection line connecting the unique contour line to the end point of the correction contour line is added.

Figure 4:
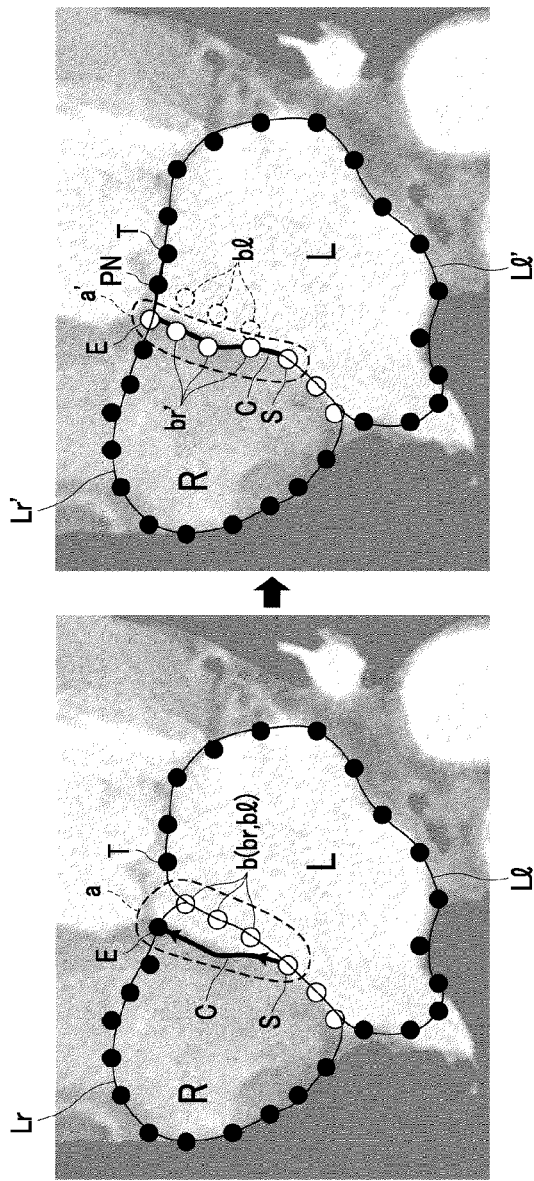
FIG. 4 is a diagram illustrating an example of a contour correction process when a start point of a correction contour line is a shared point and an end point thereof is a unique point.

For example, in two adjacent regions R and L in which a part of a contour line is shared as illustrated in a diagram on the left of FIG. 4, when a correction contour line C in which a start point S is a shared point and an end point E is a unique point is set inside the region R, a point string a on the shorter side of the contour line Lr bisected by the correction contour line C is first determined as a side to be corrected, a point string b (excluding the start point) included in the point string a is duplicated to obtain point strings br and bl, and the duplicated point strings br and bl constitute the contour lines Lr and Ll, respectively. As illustrated in a diagram on the right of FIG. 4, the point string a (including the point string br) is corrected to be a point string a' (including a point string br') on the correction contour line C. Further, the point string bl is deleted, a unique point T on the correction contour line Ll connected to the point string bl until then is connected to the end point E of the correction contour line C, and one or more new unique points PN are arranged on a connection line, as necessary. Further, the label imparting unit imparts a label "unique point" to the point string br' and the end point E.

<Start Point S: Unique point, and End Point E: Unique Point>

When it is determined that both of the start point S and the end point E are the unique points, any one side of the contour line bisected by the correction contour line of one region in which the correction contour line has been set is corrected such that the correction contour line becomes a part of the contour line of the one region after correction, and the contour line of the other region is maintained. In this case, particularly, when a shared contour line is included in the contour line of the one side (a side to be corrected), the correction contour line that has become a part of the contour line of the one region after correction through the correction becomes a unique contour line of the region, and the shared contour line corrected in the one region and maintained in the other region becomes a unique contour line in the contour line of the other region after correction.

Figure 5:
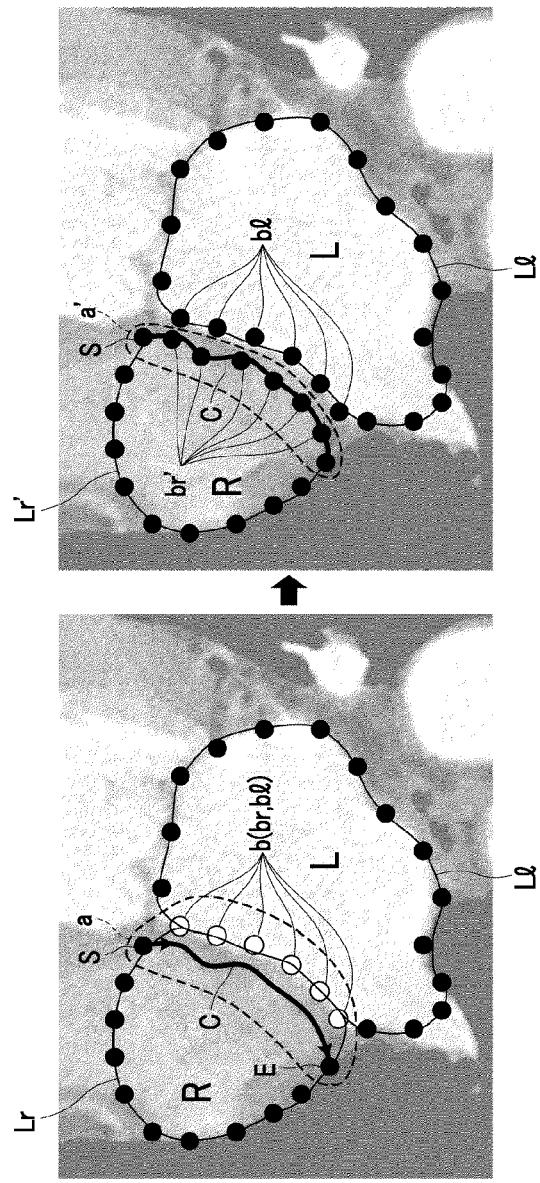
FIG. 5 is a diagram illustrating an example of a contour correction process when a start point of a correction contour line is a unique point and an end point thereof is a unique point.

For example, in two adjacent regions R and L in which a part of a contour line is shared as illustrated in a diagram on the left of FIG. 5, when a correction contour line C in which the start point S is a unique point and the end point E is a unique point is set inside the region R, a point string a on the side including a shared contour line of the contour line Lr bisected by the correction contour line C is first determined as a side to be corrected, a point string b of the shared contour line included in the point string a is duplicated to obtain point strings br and bl, and the duplicated point strings br and bl constitute the contour lines Lr and Ll, respectively. As illustrated in a diagram on the right of FIG. 5, the point string a (including the point string br) is corrected to be a point string a' (including a point string br') on the correction contour line C. On the other hand, the contour line Ll of the region L including the point string bl is maintained. Further, the label imparting unit 45 imparts a label "unique point" to the point strings br and bl.

<Start Point S: Shared Point, and End Point E: Shared Point>

Figure 6:
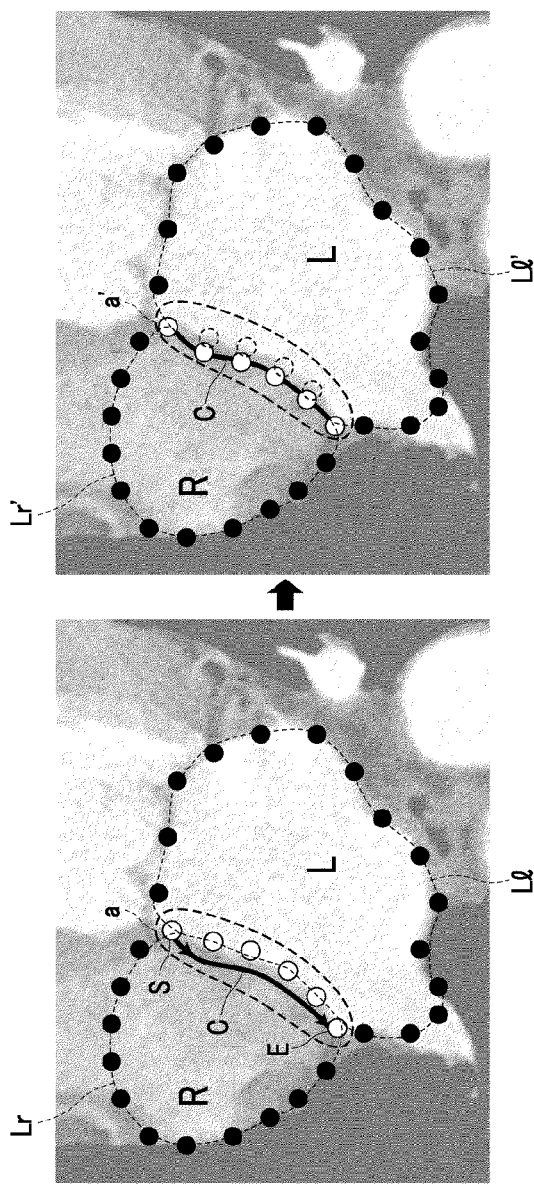
FIG. 6 is a diagram illustrating an example of a contour correction process when a start point of a correction contour line is a shared point and an end point thereof is a shared point.

When it is determined that both of the start point and the end point are shared points, one region in which the correction contour line has been set is enlarged or reduced using the correction line, and the other region is correspondingly reduced or enlarged. Specifically, the point string in a section interposed between the start point and the end point of the shared contour line is moved onto the correction contour line C while being maintained as "fixed points" so that the set correction contour line is a part of the shared contour line. For example, as illustrated in a diagram on the left of FIG. 6, in two adjacent regions R and L in which a portion of the contour line is shared, when the correction contour line C in which the start point S is the shared point and the end point E is the shared point is set inside the region R, a point string a in a section interposed between the start point S and the end point E of the shared contour line is corrected to be a point string a' on the correction contour line C, as illustrated in a diagram on the right of FIG. 6.

Information on the contour line corrected as above is stored in the data storage unit 42, and the display control unit 43 updates the display of the contour line on the display screen by referring to the stored information on the contour.

Next, an example of a flow of a process that can be performed by the contour correction device 3 will be described with reference to a flowchart of FIG. 7. First, the image data acquisition unit 41 acquires specified three-dimensional image data from the photographing device 1 or the image storage server 2 in response to an input to specify an image of the observation target and instruct to display the image from the operator (S1). Then, the display control unit 43 displays a two-dimensional sectional image or a three-dimensional image generated based on the acquired three-dimensional image data on a screen, and receives a setting of a visual line direction from the operator (S2). Then, image processing means (not illustrated) generates a plurality of successive tomographic images in the set visual line direction from the acquired three-dimensional image data, and the contour extraction unit 44 extracts contour lines of a plurality of adjacent regions from each generated tomographic image (S3).

Then, the display control unit 43 generates an image in which information on the contour line extracted from the tomographic image is displayed to be superimposed on any one tomographic image arbitrarily selected from among the plurality of generated tomographic images, and displays the image on the display screen of the display unit 51 (S4). In this screen, the operator confirms a result of the contour extraction in the displayed tomographic image, and performs an input to instruct necessary correction. The contour correction unit 46 receives this input and performs a process of correcting the contour (S5). In this case, for correction of the contour line, for example, in the contour lines of the two adjacent regions in which a part of the contour line is shared, the contour line of one of the regions is corrected so that the correction contour line becomes a part of the contour line after the correction in response to an input to set the correction contour line inside one region from the operator. In this case, when the start point of the correction contour line is located on the unique contour line of each region and the end point is located on the contour line shared by the two regions, the contour line of the other region can be maintained, and when the start point is located on the shared contour line and the end point is located on the unique contour line, the contour line of the other region can also be corrected so that the correction contour line becomes the shared contour line in the contour lines of the two regions after the correction. If the contour line is corrected, the display control unit 43 updates the display of the contour line on the display screen based on the information on the contour line after the correction.

When the contour correction process for the tomographic image ends and there is an input to instruct to switch the display to a next tomographic image from the operator (S6), the process returns to step S4, and the contour extraction result display process (S4) or the correction process (S5) is performed on the next tomographic image. When the correction is not necessary, the process of step S5 may be omitted. Further, when there is an input to instruct to change the visual line direction from the operator (S7), the process returns to step S3 and the process of step S3 and subsequent steps are performed again using the changed visual line direction. The operator confirms the results of the contour, and ends the process if it is determined that there is no more correction.

As described above, according to the contour correction device 3 in this embodiment, when the correction is performed on the contour lines of the two adjacent regions in which a part of the contour line is shared in response to an input of the correction contour line from the operator, it is determined whether a correction target is only one region or both of the regions based on a method of inputting the correction contour line (positions of the start point and the end point). Thus, it is possible to selectively execute the correction process in which the correction target is only one region and the correction process in which the correction targets are both of the regions by only inputting the correction contour line instead of separately performing an operation for designating the correction target. As a result, the operator can flexibly perform required correction with few operations.

In this embodiment, while the case in which the contour line is a point string of the control points has been described, the contour line may be treated as successive curves and each process may be executed.

Further, while the case in which the two adjacent regions in which a part of the contour line is shared are regions indicating the respective portions of the right and left ventricles of the heart has been illustrated and described in this embodiment, the contour correction method of the present invention can be suitably applied to a case in which contour lines of respective regions indicating at least two adjacent portions among, for example, blood vessels within a liver constituting the liver, and a right lobe and a left lobe of the liver, a right atrium, a right ventricle, a left atrium, a left ventricle, and a myocardium constituting the heart, and upper, middle, and lower lobes constituting a lung are corrected.

Further, in this embodiment, while the case in which a shorter contour line among the contour lines bisected by the correction contour line or the contour line in which shared contour line is included is determined as the contour line to be corrected in the contour correction process has been described, other arbitrary criteria capable of specifying any one of the bisected contour lines may be used. Examples of the criteria can include a long side, a side not including the shared contour line, and a side having a small area of a bisected region.

What is claimed is:

1. A contour correction device that corrects, for contour lines of two adjacent regions in which a part of the contour line displayed on a display screen is shared, one of the contour lines bisected by a correction contour line of one of the two regions, so that a set correction contour line becomes a part of the contour line of the one region after correction, in response to an input to set the correction contour line in which two different points on the contour line of the one region are a start point and an end point, inside the one region from an operator using input unit for designating an arbitrary position in the display screen, the contour correction device comprising:

determination unit for determining whether the start point and the end point are located on a shared contour line that is the contour line shared by the two regions or on a unique contour line that is a contour line other than the shared contour line; and contour correction unit for maintaining the contour line of the other region when correcting the contour line of the one region so that the correction contour line becomes a unique contour line in the contour line of the one region after correction, and a part that is the shared contour line of the contour line of the one region to be corrected becomes a unique contour line in the contour line of the other region after correction if it is determined that the start point is located on the unique contour line and the end point is located on the shared contour, and correcting the contour line of the other region so that the correction contour line becomes a shared contour line in the contour lines of the two regions after correction rather than the part that is a shared contour line of the contour line of the one region to be corrected when correcting the contour line of the one region, if it is determined that the start point is located on the shared contour line and the end point is located on the unique contour.

2. The contour correction device according to claim 1, wherein if it is determined that both of the start point and the end point are located on the shared contour line, the contour correction unit corrects both of the contour lines of the two regions by correcting the contour line shared by the two regions, so that the correction contour line becomes a shared contour line in the contour lines of the two regions after correction rather than a portion interposed between the start point and the end point of the shared contour line, when correcting the contour line of the one region.

3. The contour correction device according to claim 1, wherein if it is determined that both of the start point and the end point are located on the unique contour line, the contour correction unit corrects the contour line including the shared contour line among the bisected contour lines of the one region and maintains the contour line of the other region, so that the correction contour line becomes a unique contour line in the contour line of the one region after correction and the shared contour line becomes a unique contour line in the contour line of the other region after correction, when correcting the contour line of the one region.

4. The contour correction device according to claim 1, wherein the contour lines of the two regions are point strings of control points, the contour correction device includes label imparting unit for imparting different labels to the control point located on the shared contour line and the control point located on the unique contour line, and the determination unit performs the determination by referring to the respective labels imparted to the two control points corresponding to the start point and the end point.

5. The contour correction device according to claim 1, wherein the contour correction unit sets a shorter contour line among the bisected contour lines as a correction target when correcting the contour line of the one region.

6. The contour correction device according to claim 1, wherein the two regions are regions representing two adjacent portions among a right atrium, a left atrium, a right ventricle, a left ventricle, and a myocardium.

7. A contour correction method in which a contour correction program is executed on a computer, and accordingly, the computer corrects, for contour lines of two adjacent regions in which a part of the contour line displayed on a display screen is shared, one of the contour lines bisected by a correction contour line of one of the two regions, so that a set correction contour line becomes a part of the contour line of the one region after correction, in response to an input to set the correction contour line in which two different points on the contour line of the one region are a start point and an end point, inside the one region from an operator using input unit for designating an arbitrary position in the display screen, the contour correction method comprising:

determining, by the computer, whether the start point and the end point are located on a shared contour line that is the contour line shared by the two regions or on a unique contour line that is a contour line other than the shared contour line;

maintaining, by the computer, the contour line of the other region when correcting the contour line of the one region so that the correction contour line becomes a unique contour line in the contour line of the one region after correction, and a part that is the shared contour line of the contour line of the one region to be corrected becomes a unique contour line in the contour line of the other region after correction if it is determined that the start point is located on the unique contour line and the end point is located on the shared contour; and correcting, by the computer, the contour line of the other region so that the correction contour line becomes a shared contour line in the contour lines of the two regions after correction rather than the part that is a shared contour line of the contour line of the one region to be corrected when correcting the contour line of the one region, if it is determined that the start point is located on the shared contour line and the end point is located on the unique contour.

8. A non-transitory computer-readable recording medium having stored therein a contour correction program that causes a computer to execute correcting, for contour lines of two adjacent regions in which a part of the contour line displayed on a display screen is shared, one of the contour lines bisected by a correction contour line of one of the two regions, so that a set correction contour line becomes a part of the contour line of the one region after correction, in response to an input to set the correction contour line in which two different points on the contour line of the one region are a start point and an end point, inside the one region from an operator using input unit for designating an arbitrary position in the display screen, the contour correction program causing the computer to function as:

determination unit for determining whether the start point and the end point are located on a shared contour line that is the contour line shared by the two regions or on a unique contour line that is a contour line other than the shared contour line; and contour correction unit for maintaining the contour line of the other region when correcting the contour line of the one region so that the correction contour line becomes a unique contour line in the contour line of the one region after correction, and a part that is the shared contour line of the contour line of the one region to be corrected becomes a unique contour line in the contour line of the other region after correction if it is determined that the start point is located on the unique contour line and the end point is located on the shared contour, and correcting the contour line of the other region so that the correction contour line becomes a shared contour line in the contour lines of the two regions after correction rather than the part that is a shared contour line of the contour line of the one region to be corrected when correcting the contour line of the one region, if it is determined that the start point is located on the shared contour line and the end point is located on the unique contour.

* * * * *